US011257369B2

(12) United States Patent
Moretti et al.

(10) Patent No.: US 11,257,369 B2
(45) Date of Patent: Feb. 22, 2022

(54) OFF ROAD ROUTE SELECTION AND PRESENTATION IN A DRIVE ASSISTANCE SYSTEM EQUIPPED VEHICLE

(71) Applicant: GM GLOBAL TECHNOLOGY OPERATIONS LLC, Detroit, MI (US)

(72) Inventors: Brunno L. Moretti, Novi, MI (US); Luis Goncalves, Farmington Hills, MI (US); Esther Anderson, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 292 days.

(21) Appl. No.: 16/583,886

(22) Filed: Sep. 26, 2019

(65) Prior Publication Data

US 2021/0097858 A1 Apr. 1, 2021

(51) Int. Cl.
| | | |
|---|---|---|
| *G08G 1/09* | (2006.01) | |
| *G05D 1/02* | (2020.01) | |
| *G08G 1/0968* | (2006.01) | |
| *B62D 6/00* | (2006.01) | |
| *G06T 11/00* | (2006.01) | |
| *G01S 17/87* | (2020.01) | |
| *G01C 21/36* | (2006.01) | |
| *G01S 17/89* | (2020.01) | |
| *B60R 1/00* | (2022.01) | |

(52) U.S. Cl.
CPC ............ *G08G 1/0968* (2013.01); *B62D 6/00* (2013.01); *G01C 21/367* (2013.01); *G01S 17/87* (2013.01); *G01S 17/89* (2013.01); *G05D 1/0214* (2013.01); *G05D 1/0248* (2013.01); *G06T 11/00* (2013.01); *B60R 1/00* (2013.01); *B60R 2300/30* (2013.01); *G05D 2201/0213* (2013.01); *G06T 2210/56* (2013.01)

(58) Field of Classification Search
CPC ...... G08G 1/0968; G05D 1/02; G05D 1/0248; G05D 1/0214; G01S 17/89; G01S 17/87; G01C 21/367
See application file for complete search history.

(56) References Cited

U.S. PATENT DOCUMENTS

| | | | | |
|---|---|---|---|---|
| 7,583,275 | B2 * | 9/2009 | Neumann | G06T 17/00 345/419 |
| 9,384,402 | B1 * | 7/2016 | Furman | H04N 19/117 |
| 2005/0015201 | A1 * | 1/2005 | Fields | G08G 1/163 701/301 |
| 2013/0030699 | A1 * | 1/2013 | Barnes | G01C 21/367 701/455 |
| 2014/0247328 | A1 * | 9/2014 | Popham | B60W 50/14 348/49 |
| 2019/0311546 | A1 * | 10/2019 | Tay | G06T 19/006 |
| 2020/0026283 | A1 * | 1/2020 | Barnes | G05D 1/0088 |

* cited by examiner

*Primary Examiner* — Tan Q Nguyen
(74) *Attorney, Agent, or Firm* — Lorenz & Kopf LLP (57) ABSTRACT

The present application relates to a method and apparatus for determining a preferred off-road vehicle path including a lidar operative to generate a depth map of an off road surface, a camera for capturing an image of the off road surface, a processor operative to receive the depth map, determine a vehicle path in response to the depth map and a host vehicle characteristic, combine a graphical representation of the vehicle path with the image to generate an augmented image, and a display to display the augmented image to a host vehicle operator.

20 Claims, 5 Drawing Sheets

OFF ROAD ROUTE SELECTION AND PRESENTATION IN A DRIVE ASSISTANCE SYSTEM EQUIPPED VEHICLE

BACKGROUND

The present disclosure relates generally to programming motor vehicle control systems. More specifically, aspects of this disclosure relate to systems, methods and devices for selecting and presenting an off-road travel path using lidar point clouds and image fusion in an off-road vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

ADAS typically use sensors such as lidar, radar and cameras to detect and map the area surrounding the host vehicle. ADAS may be more limited under off road conditions as typical road markers, lane markers, curbs, accurate map data and other man-made indicators are unavailable as references for the ADAS. Thus, getting stuck while driving in off-road conditions and reducing or eliminating any damage to the vehicle while off-roading are important operator concerns. Selecting a travel path that is appropriate for the host vehicle is an important factor to avoid vehicle damage and safe operation in off-road conditions. It would be desirable to overcome these problems to provide a method and apparatus for an ADAS system to detect and present an off-road travel path to a vehicle operator of an off-road ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus is provided including a lidar operative to generate a depth map of an off road surface, a camera for capturing an image of the off road surface, a processor operative to receive the depth map, determine a vehicle path in response to the depth map and a host vehicle characteristic, combine a graphical representation of the vehicle path with the image to generate an augmented image, and a display to display the augmented image to a host vehicle operator.

In accordance with another aspect of the present invention the vehicle path is determined in response to a maximum vertical height of a portion of the off-road surface.

In accordance with another aspect of the present invention the apparatus includes a vehicle controller and wherein the vehicle path is used to control the host vehicle according to an assisted driving algorithm.

In accordance with another aspect of the present invention the host vehicle characteristic includes ground clearance.

In accordance with another aspect of the present invention the vehicle path is determined in response to a path width and the vehicle characteristic includes a vehicle width.

In accordance with another aspect of the present invention the processor is operative to couple the augmented image to the display.

In accordance with another aspect of the present invention the processor is further operative to determine an unpassable area in response to the depth map and the host vehicle characteristic and wherein the augmented image further includes a graphical representation of the unpassable area.

In accordance with another aspect of the present invention the vehicle path is generated in response to a user request received via a user interface.

In accordance with another aspect of the present invention, a method performed by a processor including generating, with a lidar, a point cloud of a field of view of an off-road surface, determining, with the processor, a vehicle path in response to the point cloud, generating, with the processor, a graphical representation of the vehicle path, capturing, with a camera, an image of the field of view of the off-road surface, generating an augmented image, with the processor, including overlaying the graphical representation of the vehicle path onto the image, and displaying, with a vehicle cabin display, the augmented image to a host vehicle operator.

In accordance with another aspect of the present invention wherein determining the vehicle path includes determining a slope of the off-road surface.

In accordance with another aspect of the present invention wherein determining the vehicle path includes detecting an obstruction on the off-road surface.

In accordance with another aspect of the present invention including controlling a steering of a host vehicle in response to the vehicle path.

In accordance with another aspect of the present invention wherein the vehicle path is used by a vehicle controller to perform an assisted driving algorithm.

In accordance with another aspect of the present invention wherein the vehicle path is determined in response to a host vehicle physical characteristic.

In accordance with another aspect of the present invention wherein the vehicle path is determined in response to a host vehicle ground clearance.

In accordance with another aspect of the present invention including generating a three-dimensional depth map in response to the point cloud and wherein the vehicle path is determined in response to the three dimensional depth map.

In accordance with another aspect of the present invention including determining an unpassable area in response to the point cloud, generating a graphical representation of the unpassable area and wherein the augmented image includes the graphical representation of the unpassable area.

In accordance with another aspect of the present invention wherein the vehicle path is determined in response to a user request received via a user interface.

In accordance with another aspect of the present invention, a method for performing an assisted driving operation including, receiving a request, via a user interface, to calculate an off-road vehicle route over an off-road surface, capturing a depth map, using a lidar, of the off-road surface, capturing an image, using a camera, of the off-road surface, calculating the off-road vehicle route in response to the request and the depth map, generating a graphical representation of the off-road vehicle route, generating an augmented image in response to the image and graphical representation of the off-road vehicle route, and displaying the augmented image to a vehicle operator.

In accordance with another aspect of the present invention wherein the off-road vehicle route is calculated in response to a slope of the off-road surface as determined in response to the depth map.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
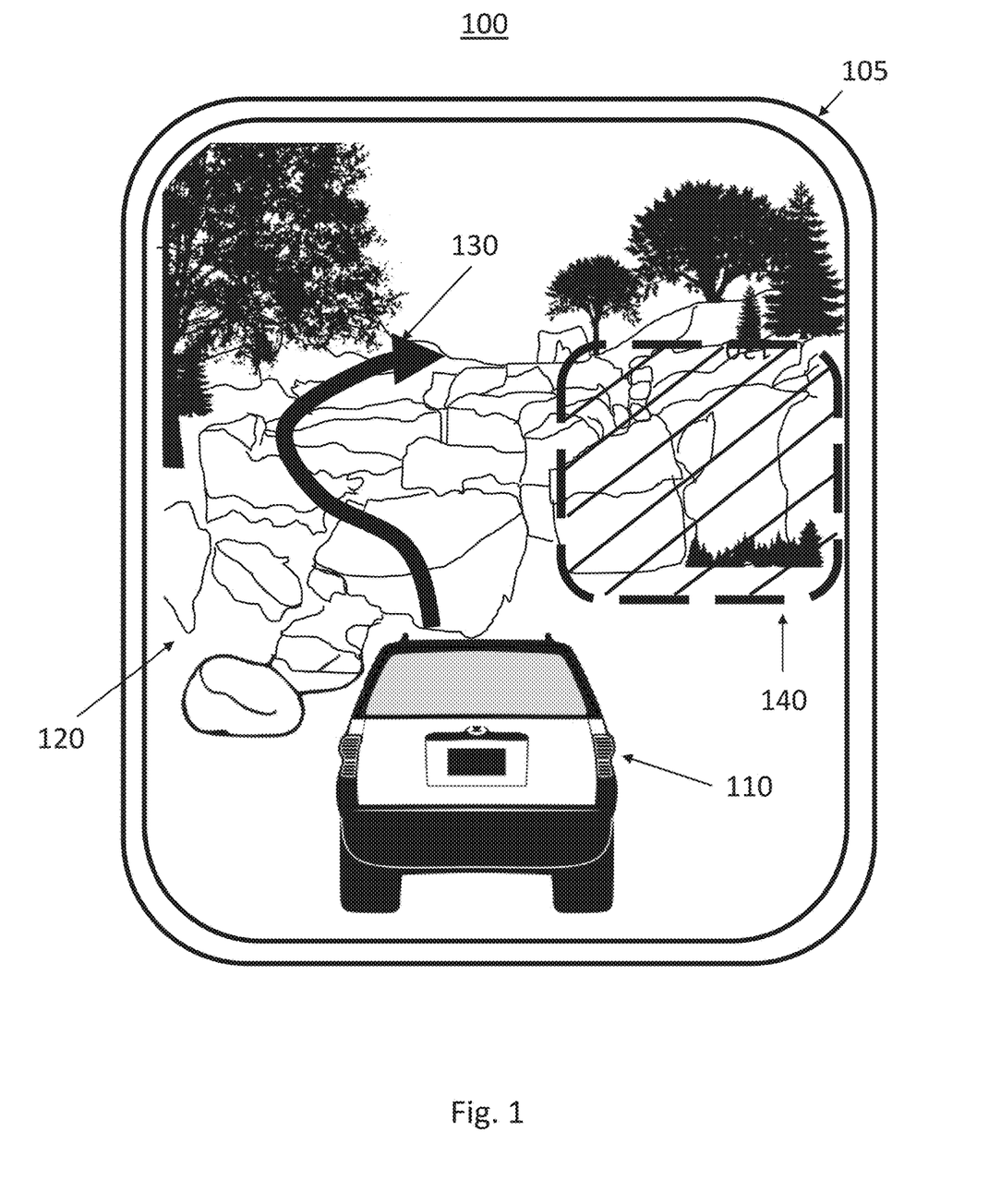
FIG. 1 shows an operating environment for off road route selection and presentation in a drive assistance system equipped vehicle according to an exemplary embodiment.

FIG. 1 schematically illustrates an operating environment 100 for off road route selection and presentation in a drive assistance system equipped vehicle 110. In this exemplary embodiment, an in-cabin display 105 is shown for an ADAS equipped off-road host vehicle 110. The display 105 is operative to show a user interface depicting a field of view captured by a camera of a potential off-road surface 120. In this exemplary embodiment, the field of view may be a forward-looking field of view and the potential off-road surface may include rocks, trees and other obstacles. The exemplary display is further operative to display a preferred off-road route 130 for the host vehicle to traverse the potential off-road surface 120 and may further include a warning indication 140 of an area of the off-road surface 120 that may not be traversable by the host vehicle 110.

The exemplary user interface depicted on the display 105 is generated by in response to an ADAS algorithm and sensor outputs for sensing the field of view. The user interface aids the vehicle operator in determining a vehicle path to avoid getting the vehicle stuck and to reduce any damage to the host vehicle 110 that may occur while traversing the vehicle path. In an exemplary embodiment, the ADAS algorithm is operative to determine the preferred off-road route 130 in response to a continuous LiDAR scan of path forward and calculating if vehicle has clearance and capability to traverse the route. Displaying the preferred off-road route 130 may enable the driver to control the off-road vehicle in response to the displayed off-road route 130 to traverse the off-road surface 120.

Currently, off-road vehicle operations must stop the off-road vehicle, exit, and physically see the path up close to see if there is clearance. Current front view cameras are unable to ascertain the depth information or resolution in detail to enable generation of three-dimensional map of the off-road surface 120. To overcome these limitations, the exemplary ADAS may receive a lidar depth map of the field of view generated by a lidar system. The ADAS may then calculate preferred off-road route 130 in response to the lidar depth map and host vehicle ground clearances, physical specifications and other vehicle capabilities. The ADAS may then correlate the lidar depth map with a camera image of the same field of view and overlay the calculated preferred off-road route 130 on the user interface for presentation on the display 105. The ADAS may update the preferred off-road route 130 at a calibratable frequency to continuously provide an updated preferred off-road route 130. In addition, the ADAS may calculate a region of the off-road surface that is impassable by the host vehicle considering the host vehicle clearances, physical specifications and other vehicle capabilities. The ADAS may then generate a warning indication 140 for presentation on the display 105 indicating the impassable area to the driver.

Figure 2:
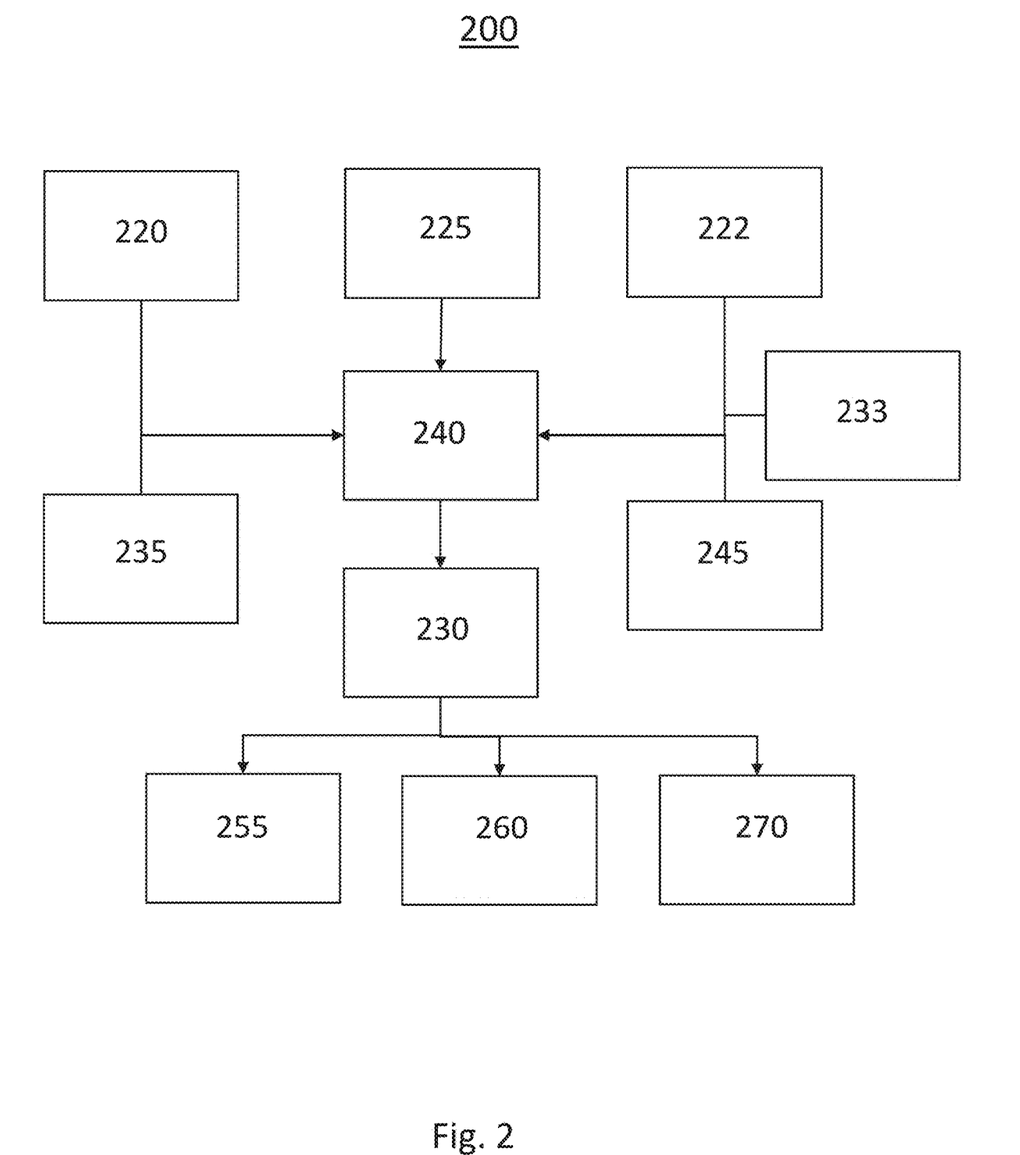
FIG. 2 shows a block diagram illustrating a system for off road route selection and presentation in a drive assistance system equipped vehicle according to an exemplary embodiment.

Turning now to FIG. 2, a block diagram illustrating an exemplary implementation of a system 200 for off road route selection and presentation in a drive assistance system equipped vehicle is shown. The system 200 may include a processor 240, a camera 220, a lidar 222, a global positioning system (GPS) 225, an inertial measurement unit (IMU) 233, a user interface 235, a memory 245, a vehicle controller 230 a throttle controller 255, a brake controller 260 and a steering controller 270.

The system is operative to use various sensors such as a camera 220, IMU 233 and lidar 222 capable of detecting and mapping various external surfaces, objects and obstacles. Sensor fusion algorithms may be used to provide accurate detection and tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects within the FOV. These objects may then be bounded and identified as an undesirable driving area and stored in a memory or added to a reference map for the ADAS.

The lidar 222 may be employed as a sensor on the host vehicle to detect surfaces and objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that may be used to determine the distance of the target vehicle from the subject vehicle. By providing a cluster of scan return points, objects having various and arbitrary shapes, such as rocks, logs, cars, trucks, trailers, bicycle, pedestrian, guard rails, etc., may be more readily detected, where the bigger and/or closer the object to the subject vehicle the more scan points are provided.

Scan points detected by the Lidar 222 may be used to generate a three-dimensional depth map of a FOV. According to an exemplary embodiment, the three-dimensional depth map may cover a forward-facing field of view wherein a off road driving surface may be mapped including relative elevations of the road surface, objects, obstacles and the like are represented within the three-dimensional depth map. Additional data, such as map data, coupled from a memory 245 or a wireless network may also be used to augment the sensor data in the generation of the depth map. Images of the FOV captured by the camera 220 may be correlated. Alternatively, a camera 220, such as a stereoscopic camera, or the like, or a radar system, or any combination thereof including the lidar may be used to generate the three-dimensional depth map.

Location data received from a GPS 225 as well as IMU 233 may be used to determine a relative vehicle location with respect to the received map data. The IMU 233 is a device used to report a specific force of a body. The IMU 233 may measure angular or linear acceleration and may be used to determine a lateral acceleration, a longitudinal acceleration, a yaw rate and pitch of a vehicle.

The user interface 235 may be a user input device, such as touch screen, dial, or button located in the vehicle cabin and accessible to the driver. Alternatively, the user interface 235 may be a program running on an electronic device, such as a mobile phone, and in communication with the vehicle, such as via a wireless network. The user interface 235 is operative to collect instructions from a vehicle operator such as initiation and selection of an ADAS function, desired vehicle speed for adaptive cruise operations, selection of vehicle motion profiles for assisted driving, etc. In response to a selection by the vehicle operator, the user interface 235 may be operative to couple a control signal or the like to the processor 240 for activation of the ADAS function.

In this exemplary embodiment, the processor 240 may be operative to perform a method for preferred off-road route selection in response to signals from various vehicle sensors, the vehicle controller 230 and the user interface 235. In one exemplary embodiment, the processor 240 may be operative to receive a request generated via the user interface 235 to initiate an off road route selection algorithm in response to a user request or a request from another ADAS function. The processor 240 is then operative to receive the three-dimensional depth map from the lidar 222 or the memory 245. The processor 240 then determines a preferred route of travel for the host vehicle over the off-road surface represented by the three-dimensional depth map. A preferred route may be determined in response to the off-road surface characteristics, such as heights of vertical surfaces within the off-road surface, width of possible paths, widths of the vertical surfaces, size of obstructions such as rocks or logs, grade of the off-road surface and the like. The off-road surface characteristics are compared to the host vehicle characteristics and capabilities to determine any unpassable areas of the off-road surface. Bounded regions around these unpassable areas may be generated and the bounded regions saved to the memory 245. In response to the off-road surface characteristics and the bounded regions of unpassable areas, the processor 240 may next generate a preferred off-road route across the off-road surface.

The processor 240 is next operative to fuse the three-dimensional depth map with one or more images of the FOV captured by the camera 220. According to the exemplary embodiment, the processor 240 may align the three-dimensional depth map with the two-dimensional image use edge detection techniques and voxelization techniques on the depth map. Once aligned, the processor may project the three-dimensional preferred off-road route on to the two-dimensional image. In addition, the processor 240 may project the bounded regions of the unpassable areas onto the two-dimensional image. The processor 240 may then couple this two-dimensional image including the preferred off-road route and the bounded regions to the user interface 235 for display to a vehicle operator.

In an alternate exemplary embodiment of the system 200 for off road route selection, the processor 240 may further be operative to couple the preferred off-road route to another ADAS processor or ADAS algorithm for used with an automated driving operation. The preferred off-road route may be used by the automated driving operation to control the host vehicle for automated driving over the preferred route. The ADAS may generate control signals in response to the off road surface, sensor outputs, map data, GPS locations and the like, and couple these control signals to the vehicle controller 230 in the automated driving operation.

The vehicle controller 230 may generate control signals for coupling to other vehicle system controllers, such as a throttle controller 255, a brake controller 260 and a steering controller 270 in order to control the operation of the vehicle in response to the ADAS algorithm. The vehicle controller may be operative to adjust the speed of the vehicle by reducing the throttle via the throttle controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
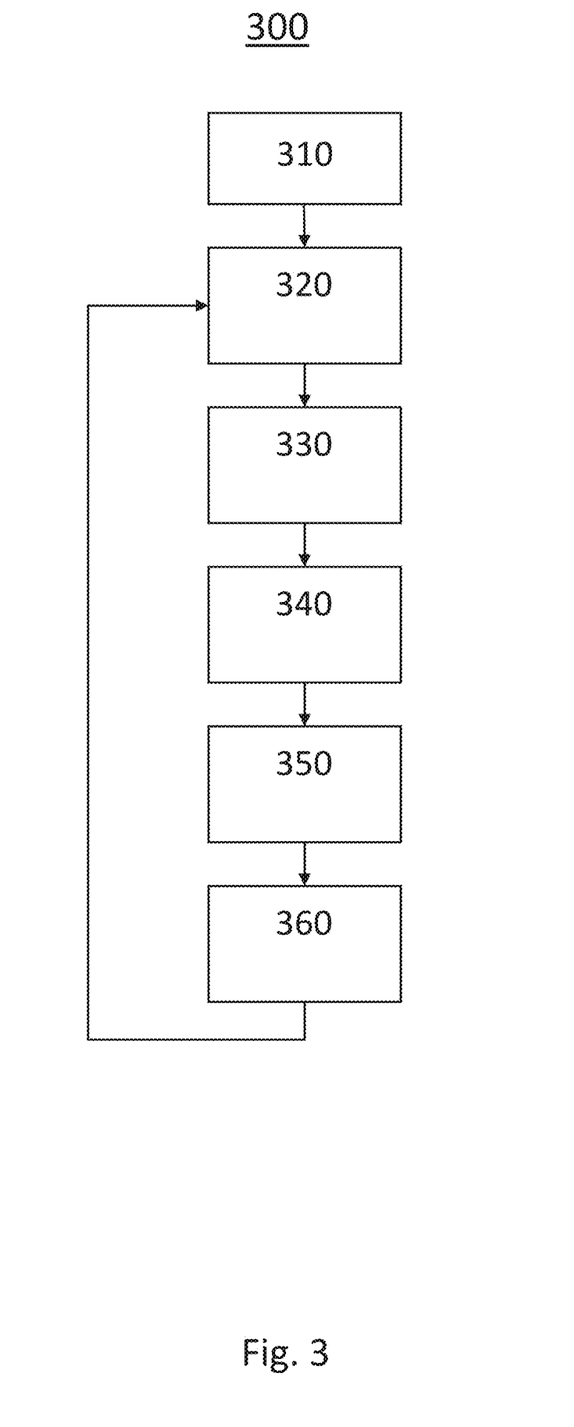
FIG. 3 shows a flow chart illustrating a method for off road route selection and presentation in a drive assistance system equipped vehicle according to an exemplary embodiment.

Turning now to FIG. 3, a flow chart illustrating an exemplary implementation of a method 300 for preferred off-road route selection is shown. The method is first operated to initiate 310 the driving assistance algorithm for preferred off road route select in response to a request. The requested may be generated by a user interface in response to a user input or may be generated in response to an ADAS request from another ADAS algorithm or the like. For example, the request may be generated in response to an off-road adaptive cruise control, or crawl control, algorithm.

In response to the initiation of the ADAS algorithm, the method is next operative to generate 320 a three-dimensional point map of the FOV. The FOV may be a forward looking FOV from the host vehicle. The three-dimensional point map may be generated in response to a lidar scan of the FOV. The lidar may be operative to first generate a depth map and a voxelization process may be performed on the depth map to generate the three-dimensional point map.

The method is next operative to calculate 330 a preferred off-road path in response to the three-dimensional point map. The preferred off-road route may be determined in response to the off-road surface characteristics, such as heights of vertical surfaces within the off-road surface, width of possible paths, widths of the vertical surfaces, size of obstructions such as rocks or logs, grade of the off-road surface and the like. The method may further be operative to determine unpassable areas of the off-road surface.

The method is next operative to capture 340 an image of the FOV using a camera or a plurality of cameras. In one exemplary embodiment, the image of the FOV may be generated by combining multiple images together to cover the FOV of the lidar. The method is then operative to overlay 350 the referred off-road route and/or the unpassable areas onto the image of the FOV. Projection of the off-road route and/or the unpassable areas may be performed using a 3D geometric projection from the a voxelized volume of the three-dimensional point map to the two-dimensional image space. The project may be performed in response to a center reprojection along a principle axis onto an image play orthogonal to the principle axis. The method may be operative to calibrate and co-register the point in point cloud and the pixels in image and the project the preferred route from point cloud space to image plane to generate an annotated two-dimensional image including the preferred off-road route and/or the unpassable areas.

The method is then operative to couple 360 the annotated image to a user interface for display to a vehicle operator. The vehicle operator may control the vehicle in response to the annotated image to traverse the preferred route. The method then returns to generate 320 an updated 3D point map in order to continuously update the preferred off-road route. The frequency of the update may be determined in response to processing power and time of the ADAS processor or the like.

Figure 4:
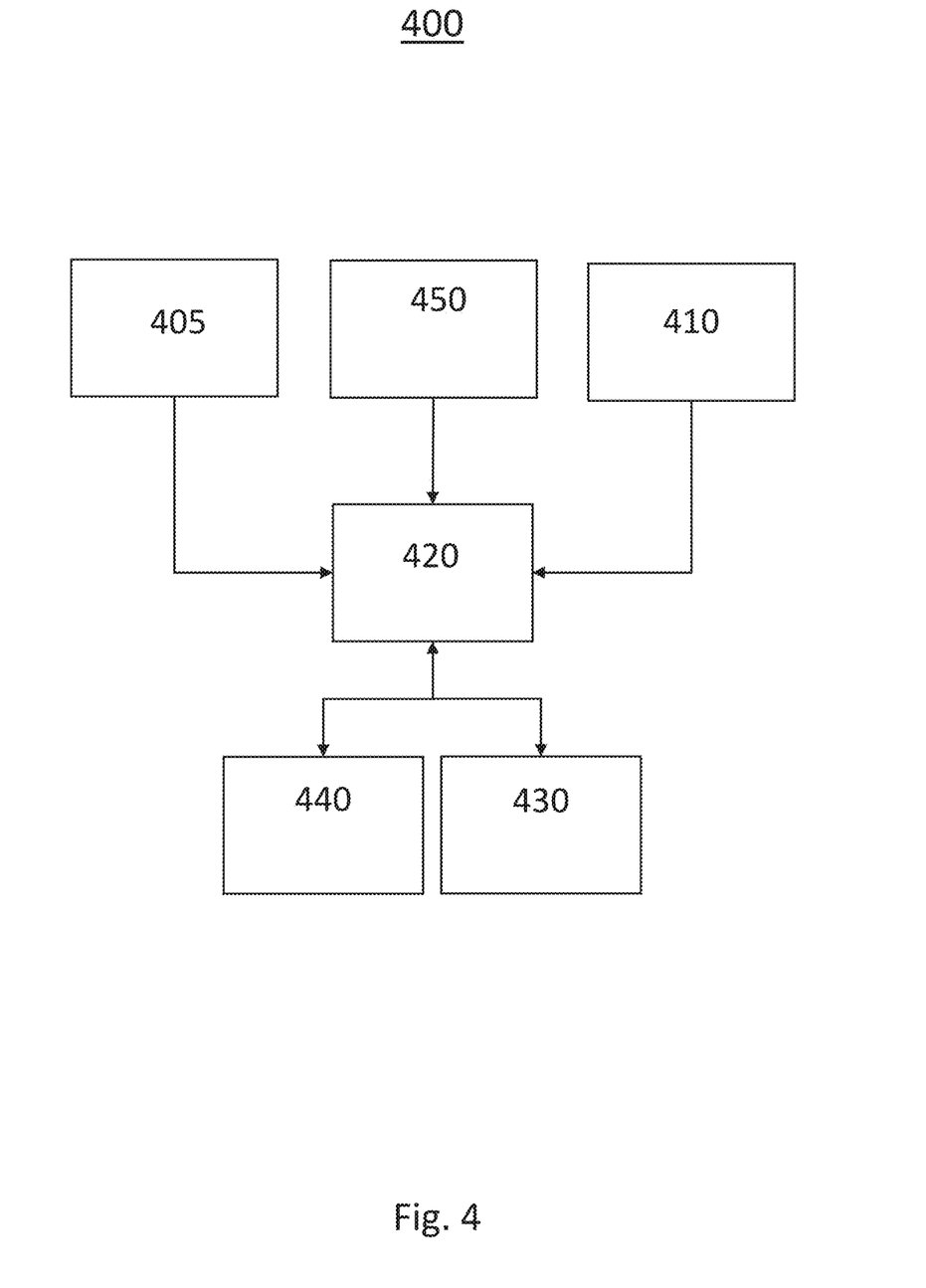
FIG. 4 shows a block diagram illustrating a system for off road route selection and presentation in a drive assistance system equipped vehicle according to another exemplary embodiment.

Turning now to FIG. 4, a block diagram illustrating another exemplary implementation of a system 400 for off road path route calculation including a lidar 405, a camera 410, a processor 420, a display 430, a vehicle controller 440, and a user interface 450.

The lidar 405 is operative to generate a depth map of an off-road surface. The depth map provides a distance from the transmitter to the surface for a number of azimuth and elevation points. The depth map may be used to generate a three-dimensional representation of the off-road surface using a voxelization processor or other conversion process. Multiple scans of each azimuth and election point generated by the lidar 405 may be used to generate the depth map. The camera 410 may be a front mounted camera mounted on the roof of the host vehicle and may be operative to capture one or more images of the off-road surface within the camera FOV.

The processor 420 may receive the depth map from the lidar 405 or from a memory and may determine a vehicle path in response to the depth map and a host vehicle characteristic. The vehicle path may be determined in re in response to a user request received via a user interface 450 or in response to a request from another vehicle system operative to perform a driving assistance operation. The host vehicle characteristic may be a vehicle dimension, ground clearance, vehicle width, engine capacity, torque, or any other physical or performance characteristic of the host vehicle. In one exemplary embodiment, the vehicle path may be determined in response to a maximum vertical height of a portion of the off-road surface. The vehicle path may be determined in response to a slope or grade of the off-road surface. The processor 420 may then generate a graphical representation of the vehicle path in response to a path width and the host vehicle characteristic. The graphical representation of the vehicle path may then be overlaid with the image captured by the camera 410 to generate an augmented image. The processor 420 may then couple the augmented image to the display 440. In addition, the processor 420 may be further operative for determining an unpassable area in response to the depth map and the host vehicle characteristic. The processor 420 may generate a graphical representation of the unpassable area in response to the determination. The augmented image may further be generated to include the graphical representation of the unpassable area.

The display 430 may be an in-cabin vehicle display operative to display a graphical user interface to an operator of the host vehicle. The display 430 may further display the augmented image to a host vehicle operator as part of the graphical user interface. In addition, a vehicle controller 440 may be operative to receive the vehicle path and to control the host vehicle according to an assisted driving algorithm in response to the vehicle path.

Figure 5:
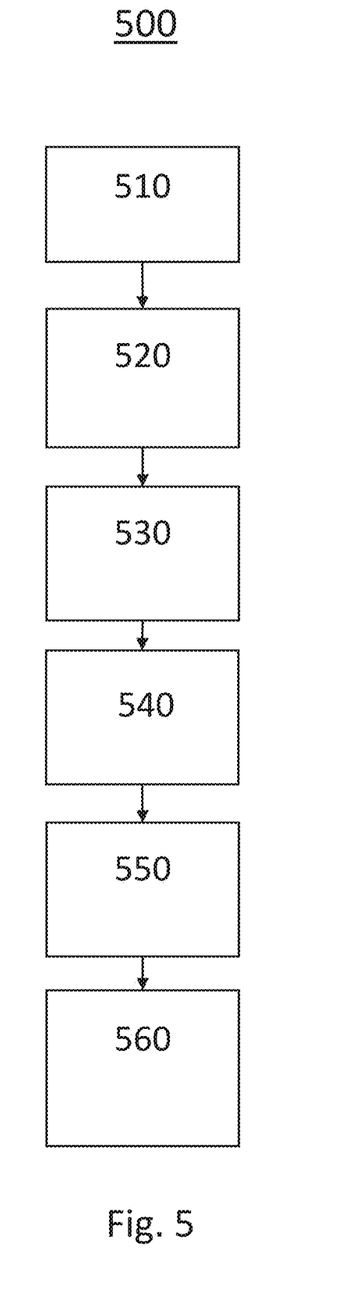
FIG. 5 shows a flow chart illustrating a method for off road route selection and presentation in a drive assistance system equipped vehicle according to another exemplary embodiment.

Turning now to FIG. 5, a flow chart illustrating an exemplary implementation of a method 500 for off road adaptive cruise control in a host vehicle is shown. The method may be performed by an ADAS processor or the like and is first operative for generating 510, in response to a lidar, a point cloud of a field of view of an off-road surface. In one exemplary embodiment, the point could may be a depth with a distance from the transmitter determined for a number of elevation angles and azimuth angles. A three-dimensional depth map may be generated by a processor in response to the point cloud using a voxelization process or other conversion process. The three-dimensional depth map may then be used to determine off-road surface dimensions, slopes, grades etc., to enable determination of impassable areas and the like. In this exemplary embodiment, a vehicle path may be determined in response to the three-dimensional depth map.

The method in next operative for determining 520 a vehicle path in response to the point cloud or the three-dimensional depth map. The vehicle path may be determined by a processor, such as a digital signal processor, a video processor, an image processor or the like. In one exemplary embodiment, determining the vehicle path may include determining a slope of the off-road surface. In another embodiment, determining the vehicle path may include detecting an obstruction on the off-road surface. The obstruction may include rocks, logs, and/or other loose materials which may be difficult for a vehicle to traverse. In determine the vehicle path, the method may optionally determine to avoid these obstacles as their rigidity may be unknown. The determined vehicle path may be coupled to a vehicle controller and used to perform an assisted driving algorithm, such as an adaptive cruise control algorithm for off-road vehicle operation or a fully autonomous off-road driving operation. The vehicle path may be used for controlling a steering of a host vehicle, a throttle setting of a host vehicle, or a braking system of a host vehicle in response to the vehicle path In another exemplary embodiment, the vehicle path is determined in response to a host vehicle physical characteristic and the three-dimensional depth map or the point cloud from the lidar. In one exemplary embodiment, the host vehicle physical characteristic may be a host vehicle ground clearance. The method may alternatively be operative for determining an unpassable area in response to the point cloud or the three-dimensional depth. In one exemplary embodiment, the vehicle path determination may be initiated in response to a user request received via a user interface.

The method is next operative for generating 530 a graphical representation of the vehicle path. The method further may be operative to generate a graphical representation of the unpassable area and wherein the augmented image includes the graphical representation of the unpassable area.

The method is next operative for capturing 540, with a camera, an image of the field of view of the off-road surface. The image is aligned with the graphical representations of the vehicle path and/or unpassable areas. Alternatively, the image may be aligned with the point cloud or three-dimensional depth map using an image processor to perform edge detection techniques or other image detection algorithms. The method is next operative to overlay 550 the graphical representation of the vehicle path and/or unpassable areas, onto the image to generate an augmented image. The method is further operative for displaying 560 the augmented image to a host vehicle operator. The augmented image may be displayed on a vehicle cabin user interface, or display. The augmented image may be wireless coupled to a mobile device for presentation to the vehicle operator or other user.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a lidar operative to generate a depth map of an off road surface;
   a camera for capturing an image of the off road surface;
   a processor operative to receive the depth map, determine a vehicle path in response to the depth map and a host vehicle characteristic, combine a graphical representation of the vehicle path with the image to generate an augmented image; and
   a display operative to display the augmented image to a host vehicle operator.

2. The apparatus of claim 1 wherein the processor is operative to determine the vehicle path in response to a maximum vertical height of a portion of the off-road surface.

3. The apparatus of claim 1 further including a vehicle controller and wherein the vehicle path is used to control a host vehicle according to an assisted driving algorithm.

4. The apparatus of claim 1 wherein the host vehicle characteristic includes ground clearance.

5. The apparatus of claim 1 wherein the processor is operative to determine the vehicle path in response to a path width and the vehicle characteristic includes a vehicle width.

6. The apparatus of claim 1 wherein the processor is operative to couple the augmented image to the display.

7. The apparatus of claim 1 wherein the processor is further operative to determine an unpassable area in response to the depth map and the host vehicle characteristic and wherein the augmented image further includes a graphical representation of the unpassable area.

8. The apparatus of claim 1 wherein the processor is operative to generate the vehicle path in response to a user request received via a user interface.

9. A method performed by a processor comprising:
   generating, with a lidar, a point cloud of a field of view of an off-road surface;
   determining, with the processor, a vehicle path in response to the point cloud;
   generating, with the processor, a graphical representation of the vehicle path;
   capturing, with a camera, an image of the field of view of the off-road surface;
   generating an augmented image, with the processor, including overlaying the graphical representation of the vehicle path onto the image; and
   displaying, with a vehicle cabin display, the augmented image to a host vehicle operator.

10. The method of claim 9 wherein determining the vehicle path includes determining a slope of the off-road surface.

11. The method of claim 9 wherein determining the vehicle path includes detecting an obstruction on the off-road surface.

12. The method of claim 9 further including controlling a steering of a host vehicle in response to the vehicle path.

13. The method of claim 9 wherein the vehicle path is used by a vehicle controller to perform an assisted driving algorithm.

14. The method of claim 9 wherein the vehicle path is determined in response to a host vehicle physical characteristic.

15. The method of claim 9 wherein the vehicle path is determined in response to a host vehicle ground clearance.

16. The method of claim 9 further including generating a three-dimensional depth map in response to the point cloud and wherein the vehicle path is determined in response to the three dimensional depth map.

17. The method of claim 9 further including determining an unpassable area in response to the point cloud, generating a graphical representation of the unpassable area and wherein the augmented image includes the graphical representation of the unpassable area.

18. The method of claim 9 wherein the vehicle path is determined in response to a user request received via a user interface.

19. A method for performing an assisted driving operation comprising:
   receiving a request, via a user interface, to calculate an off-road vehicle route over an off-road surface;
   capturing a depth map, using a lidar, of the off-road surface;
   capturing an image, using a camera, of the off-road surface;
   calculating the off-road vehicle route in response to the request and the depth map;
   generating a graphical representation of the off-road vehicle route;
   generating an augmented image in response to the image and graphical representation of the off-road vehicle route; and
   displaying the augmented image to a vehicle operator.

20. The method for performing an assisted driving operation of claim 19 wherein the off-road vehicle route is calculated in response to a slope of the off-road surface as determined in response to the depth map.

* * * * *